United States Patent
Gift et al.

(10) Patent No.: US 9,527,425 B2
(45) Date of Patent: Dec. 27, 2016

(54) GRAVITY BIASED LOAD CONSTRAINING DEVICES AND VEHICLES INCORPORATING THE SAME

(71) Applicant: Toyota Motor Engineering & Manufacturing North America, Inc., Erlanger, KY (US)

(72) Inventors: Robert J. Gift, Georgetown, KY (US); Blair C. Perkins, Georgetown, KY (US); Michael C. Greenlee, Paris, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/311,830

(22) Filed: Jun. 23, 2014

(65) Prior Publication Data

US 2015/0367769 A1    Dec. 24, 2015

(51) Int. Cl.
*B60P 7/08* (2006.01)
*B60P 7/06* (2006.01)
*B60P 7/135* (2006.01)

(52) U.S. Cl.
CPC ............ *B60P 7/0892* (2013.01); *B60P 7/06* (2013.01); *B60P 7/135* (2013.01)

(58) Field of Classification Search
CPC ............ B60P 7/0892; B60P 7/06; B60P 7/135
USPC ............ 410/69, 70, 80, 94, 95, 121, 77, 153
See application file for complete search history.

(56) References Cited

U.S. PATENT DOCUMENTS

| | | | |
|---|---|---|---|
| 1,570,288 A * | 1/1926 | Smith | B60P 7/13 410/80 |
| 2,818,156 A | 12/1957 | Edwards | |
| 3,352,584 A | 11/1967 | Engel | |
| 5,311,824 A | 5/1994 | Pavlick et al. | |
| 6,491,485 B2 * | 12/2002 | Zavitz | B60P 7/08 410/35 |
| 7,748,514 B2 | 7/2010 | Shimizu et al. | |
| 8,215,240 B2 | 7/2012 | Graff et al. | |
| 2010/0310352 A1 | 12/2010 | Moberg | |

* cited by examiner

*Primary Examiner* — Stephen Gordon
(74) *Attorney, Agent, or Firm* — Dinsmore & Shohl LLP

(57) ABSTRACT

Vehicles having gravity biased gate members utilized to laterally constrain a load are disclosed. In one embodiment, a vehicle includes one or more wheels that allow movement of the vehicle from one location to another location, a frame mounted to the one or more wheels, a load bearing deck supported by the frame, the load bearing deck having a support surface for supporting a load thereon, and a gravity biased gate member rotatably coupled at the load bearing deck at an axis of rotation. The gravity biased gate member includes a bottom portion below the axis of rotation that is heavier than a top portion above the axis of rotation such that a center of mass of the gravity biased gate member is offset from the axis of rotation, biasing the gravity biased gate member into an extended configuration.

20 Claims, 11 Drawing Sheets

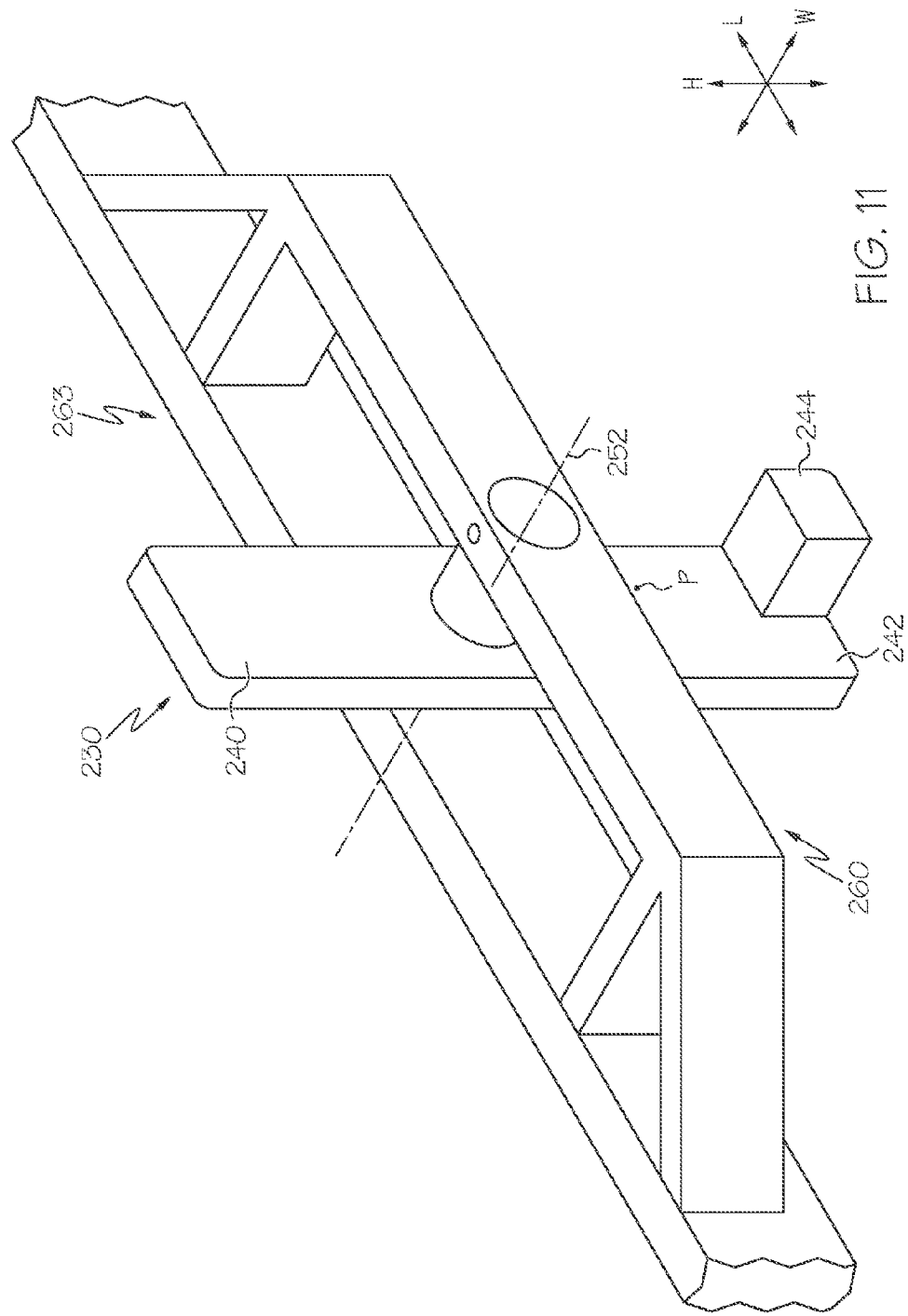

GRAVITY BIASED LOAD CONSTRAINING DEVICES AND VEHICLES INCORPORATING THE SAME

TECHNICAL FIELD

The present specification generally relates to vehicles having gravity biased load constraining devices and, more particularly, to vehicles having gravity biased gate members for use in pallet changing systems.

BACKGROUND

Load bearing vehicles may be used to carry and transport loads in a variety of settings, for example, in a manufacturing facility or a warehouse. Load constraining devices may be coupled to a vehicle to provide lateral constraint to the load being carried and transported by the vehicle. The load constraining devices may be coupled to the vehicle to provide a barrier and inhibit lateral movement of the load off of the vehicle. In some instances, the load constraining devices can be removed as a constraint to facilitate removal of the load from the vehicle. However, users can forget to replace the load constraining devices, leaving the load unconstrained, allowing the load to fall off the vehicle unintentionally.

Accordingly, other load constraining devices may be desired to provide lateral constraint to a load during vehicle operation without user intervention.

SUMMARY

In one embodiment, a vehicle includes one or more wheels that allow movement of the vehicle from one location to another location, a frame mounted to the one or more wheels, a load bearing deck supported by the frame, the load bearing deck having a support surface for supporting a load thereon, and a gravity biased gate member rotatably coupled at the load bearing deck at an axis of rotation. The gravity biased gate member includes a bottom portion below the axis of rotation that is heavier than a top portion above the axis of rotation such that a center of mass of the gravity biased gate member is offset from the axis of rotation, biasing the gravity biased gate member into an extended configuration.

In another embodiment, a pallet changing system includes a vehicle having one or more wheels that allow movement of the vehicle from one location to another location, a frame mounted to the one or more wheels, a load bearing deck supported by the frame, the load bearing deck having a support surface for supporting a load thereon, and a gravity biased gate member rotatably coupled at the load bearing deck at an axis of rotation. The gravity biased gate member includes a bottom portion below the axis of rotation that is heavier than a top portion above the axis of rotation such that a center of mass of the gravity biased gate member is offset from the axis of rotation, biasing the gravity biased gate member into an extended configuration. A pallet changing table includes a gate member engagement member that is engageable with the bottom portion of the gravity biased gate member such that when the bottom portion of the gravity biased gate member engages with the gate member engagement member, the gravity biased gate member is moved into a retracted configuration.

In another embodiment, a method of constraining a load carried by a vehicle includes placing a load on a load bearing deck of a vehicle and constraining the load using a gravity biased gate member rotatably coupled at the load bearing deck at an axis of rotation and in an extended configuration. The gravity biased gate member includes a bottom portion that is heavier than a top portion such that a center of mass of the gravity biased gate member is offset from the axis of rotation, biasing the gravity biased gate member into the extended configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 11 depicts an isometric view of another embodiment of a gravity biased gate member in rotational engagement with an inner support member and a gate member support structure according to one or more embodiments described herein.

DETAILED DESCRIPTION

Embodiments of the present disclosure are directed to vehicles having gravity biased gate members for laterally constraining a load positioned on a support surface of a load bearing deck of the vehicle. One or more gravity biased gate members may be rotatably coupled to one or more opposite sides of a vehicle at the load bearing deck of the vehicle. The gravity biased gate members include a bottom portion that is heavier than a top portion such that a center of mass of the gravity biased gate member is offset from an axis of rotation of the gravity biased gate members, biasing the top portion of the gravity biased gate members into an extended configuration such that the top portion of the gravity biased gate members extend above the support surface of the vehicle, laterally constraining the load. This can inhibit the load from falling off the vehicle unintentionally, even when the gravity biased gate members are the only load constraining devices in use.

Figure 1:
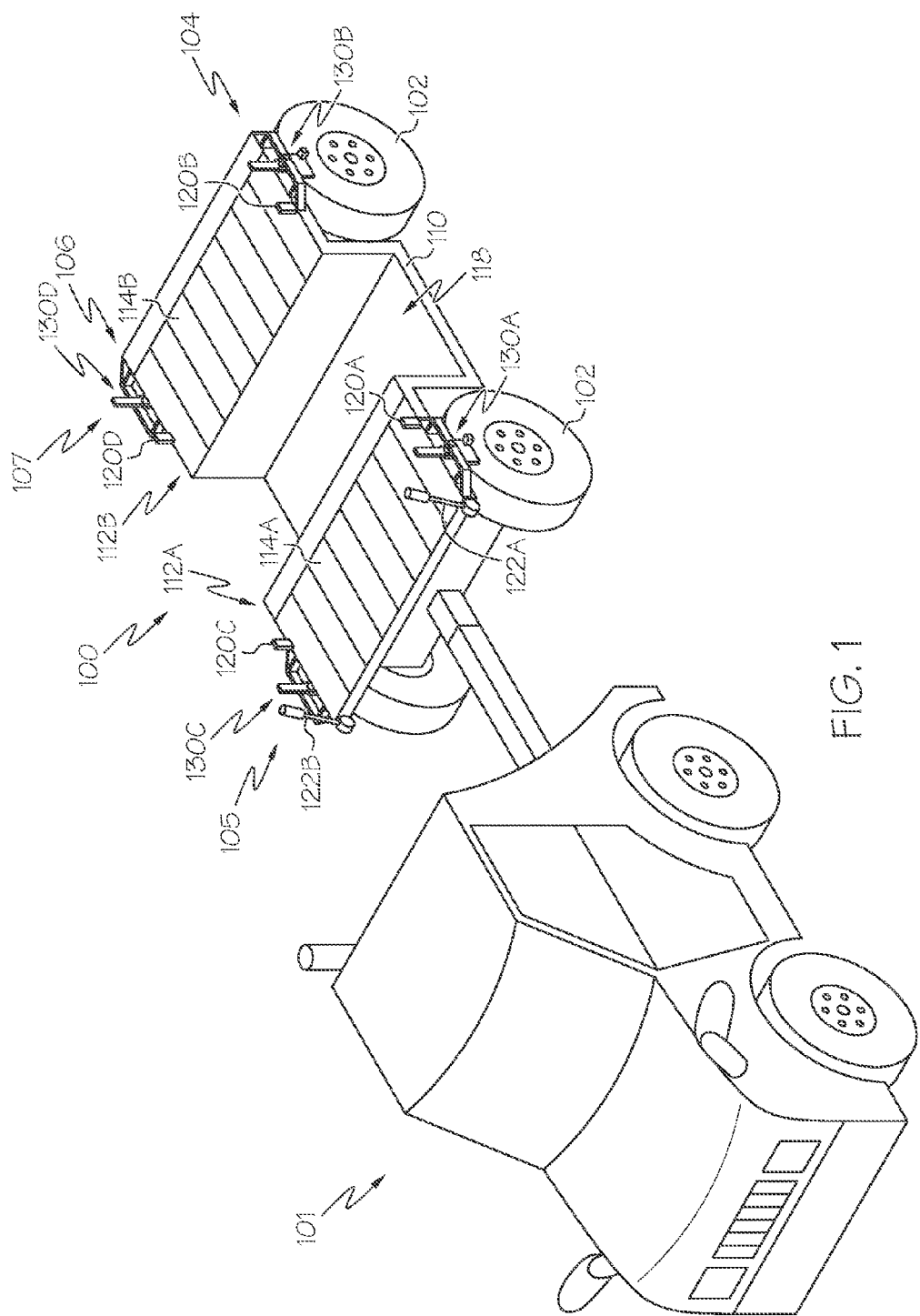
FIG. 1 depicts a perspective view of a vehicle according to one or more embodiments described herein.

Referring now to FIG. 1, a vehicle 100 configured to constrain and transport a load is depicted. As used herein, the term "vehicle" refers to any conveyance by which a load is transported, such as moving on wheels, runners, tracks, or the like. The vehicle 100 depicted in FIG. 1 is a towed vehicle 100 that is coupled to a towing vehicle 101 having an engine or motor for powering the towing vehicle 101 and moving the towed vehicle 100. It should be understood that vehicle 100 can be any towed vehicle or self-propelled vehicle, such as, for example, an axle dolly, a cart, a trailer, a truck, or the like. The vehicle 100 includes one or more wheels 102 (e.g., four or more wheels) that allow movement of the vehicle 100 from one location to another location and a frame 110 mounted on the one or more wheels 102. The frame 110 can be any exemplary frame structure, such as, for example, a ladder frame, a backbone tube frame, an x-frame, a perimeter frame, a platform frame, a unibody frame, or the like.

Figure 2:
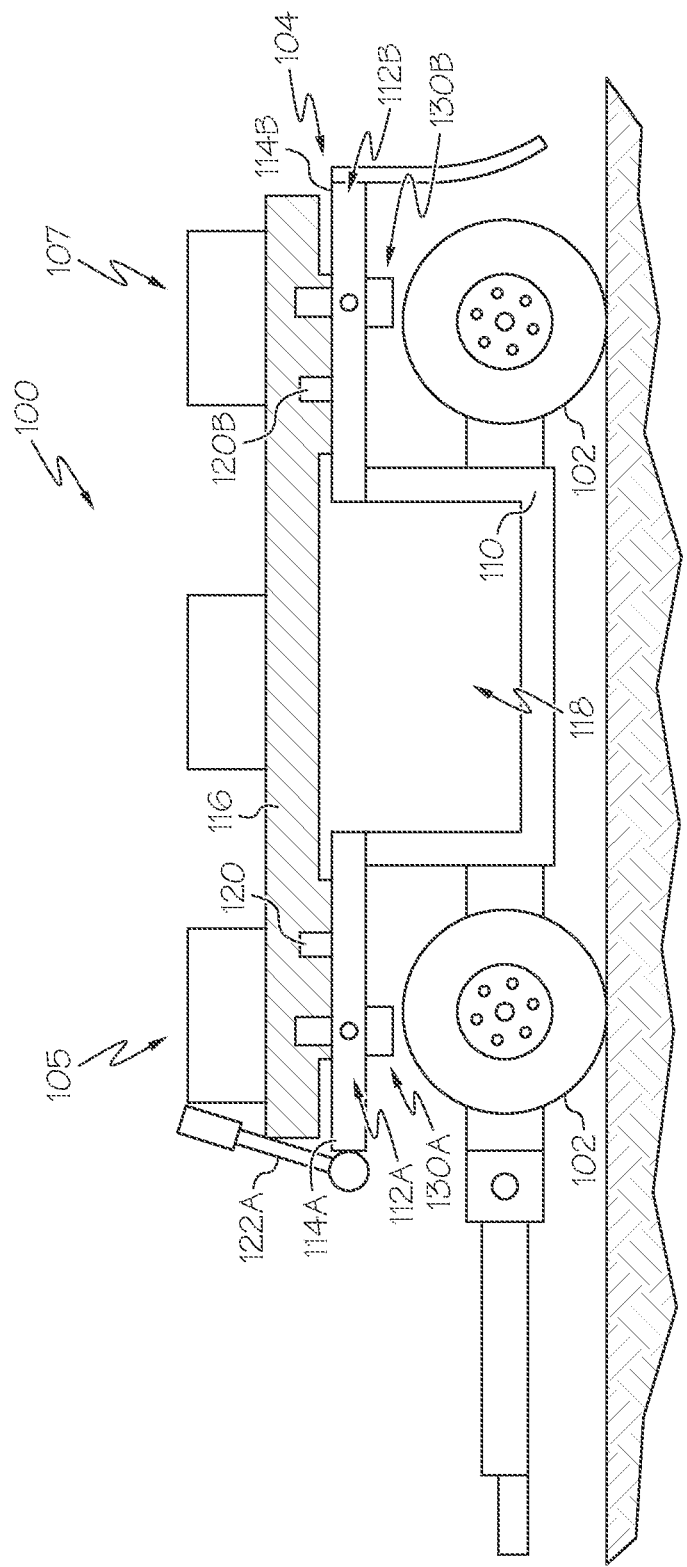
FIG. 2 depicts a side view of a vehicle according to one or more embodiments described herein.

The vehicle 100 can further include a load bearing deck 112 structurally supported by the frame 110. For example, the load bearing deck 112 can be mounted on the frame 110 using any exemplary mounting method such as, for example, fasteners, latches, welding, or the like. The load bearing deck 112 includes a support surface 114 for carrying and supporting the load 116 (e.g., as depicted in FIG. 2), such as a pallet, which allows the load 116 to be transported on the vehicle 100. The support surface 114 may comprise rollers, wheels, or the like to facilitate loading and unloading of the load 116. As depicted in FIG. 1, the vehicle 100 may further include a recessed portion 118 such that the vehicle 100 includes a first load bearing deck 112A located at a front portion 105 of the vehicle 100 and a second load bearing deck 112B located at a rear portion 107 of the vehicle 100. The recessed portion 118 can allow a user of the vehicle 100 to stand on the vehicle 100, between the first load bearing deck 112A and the second load bearing deck 112B. This can help facilitate loading and unloading of the load 116. In some embodiments, the vehicle 100 may not include the recessed portion 118. In these embodiments, the vehicle 100 can include one continuous load bearing deck 112 extending over the front and rear portions 105 and 107. It should be understood that vehicles 100 may comprise a variety of shapes and sizes including one or more load bearing decks 112.

As depicted in FIG. 1, two or more manually actuated gate members 120 and two or more gravity biased gate members 130 can be coupled to the vehicle 100 at the first load bearing deck 112A and the second load bearing deck 112B on both a first side 104 of the vehicle 100 and a second side 106 of the vehicle 100, opposite the first side 104 of the vehicle 100. For example, as depicted in FIG. 1, a first manually actuated gate member 120A is coupled to the first side 104 of the front portion 105 of the vehicle 100 at the first load bearing deck 112A and a second manually actuated gate member 120B and is coupled to the first side 104 of the rear portion 107 of the vehicle 100 at the second load bearing deck 112B. Likewise, a third manually actuated gate member 120C is coupled to the second side 106 of the front portion 105 of the vehicle 100 at the first load bearing deck 112A and a fourth manually actuated gate member 120D is coupled to the second side 106 of the rear portion 107 of the vehicle 100 at the second load bearing deck 112B. As also depicted in FIG. 1, a first gravity biased gate member 130A is coupled to the first side 104 of the front portion 105 of the vehicle 100 at the first load bearing deck 112A and a second gravity biased gate member 130B and is coupled to the first side 104 of the rear portion 107 of the vehicle 100 at the second load bearing deck 112B. Likewise, a third gravity biased gate member 130C is coupled to the second side 106 of the front portion 105 of the vehicle 100 at the first load bearing deck 112A and a fourth gravity biased gate member 130D is coupled to the second side 106 of the rear portion 107 of the vehicle 100 at the second load bearing deck 112B.

Referring now to FIG. 2, the first side 104 of the vehicle 100 is depicted with the load 116 being positioned on a first support surface 114A of the first load bearing deck 112A and on a second support surface 114B of the second load bearing decks 112B, spanning the recessed portion 118. In this embodiment, the first manually actuated gate member 120A is coupled to the first side 104 of the vehicle 100 at the first load bearing deck 112A and the second manually actuated gate member 120B is coupled to the first side 104 of the vehicle 100 at the second load bearing deck 112B, using any exemplary coupling technique, for example, a rotatable coupling, or the like. The first and second manually actuated gate members 120A and 120B are actuatably connected to a first manually actuated gate member lever 122A to allow the first and second manually actuated gate members 120A and 120B to be moved into an extended configuration or a retracted configuration by moving the first manually actuated gate member lever 122A. The first manually actuated gate member lever 122A and any additional manually actuated gate member levers may be mounted to any location on the vehicle 100 using any exemplary mounting method, for example, fasteners, latches, welding, or the like. While only first and second manually actuated gate members 120A and 120B are shown, third and fourth manually actuated gate members 120C and 120D may operate in the same or similar fashion.

In the extended configuration, at least a portion of the first and second manually actuated gate members 120A and 120B extend above the first and second support surfaces 114A and 114B of the first and second load bearing decks 112A and 112B, respectively, laterally constraining the load 116. In the retracted configuration, the first and second manually actuated gate members 120A and 120B are retracted below the first and second support surfaces 114A and 114B of the first and second load bearing decks 112A and 112B, removing lateral constraint from the load 116. In some embodiments, a single manually actuated gate member lever 122 can actuate all the manually actuated gate members 120A, 120B, 120C, and 120D. In some embodiments, as depicted in FIG. 1, a first manually actuated gate member lever 122A can move the first and second manually actuated gate members 120A and 120B located on the first side 104 of the vehicle 100 and a second manually actuated gate member lever 122B can move the third and fourth manually actuated gate members 120C and 120D located on the second side 106 of the vehicle 100. In other embodiments, individual manually actuated gate member levers 122 are configured to operate individual manually actuated gate members 120 such that the vehicle 100 includes an equal number of manually actuated gate member levers 122 and manually actuated gate members 120.

Referring still to FIG. 2, In this embodiment, the first gravity biased gate member 130A is coupled to the first side 104 of the vehicle 100 at the first load bearing deck 112A and the second gravity biased gate member 130B is coupled to the first side 104 of the vehicle 100 at the second load bearing deck 112B, using any exemplary coupling technique, for example, a rotatable coupling, or the like. While only first and second gravity biased gate members 130A and 130B are shown, third and fourth gravity biased gate members 130C and 130D may operate in the same or similar fashion. First and second gravity biased gate members 130A and 130B are rotatable to allow the first and second gravity biased gate members 130A and 130B to be moved into the extended configuration or the retracted configuration. In the extended configuration, at least a portion of the first and second gravity biased gate members 130A and 130B extend above the first and second support surfaces 114A and 114B of the first and second load bearing decks 112A and 112B, respectively. In a retracted configuration, the first and second gravity biased gate members 130A and 130B are retracted below the first and second support surfaces 114A and 114B of the first and second load bearing decks 112A and 112B, respectively. The extended configuration laterally constrains the load 116 and the retracted configuration removes lateral constraint from the load 116.

Figure 3:
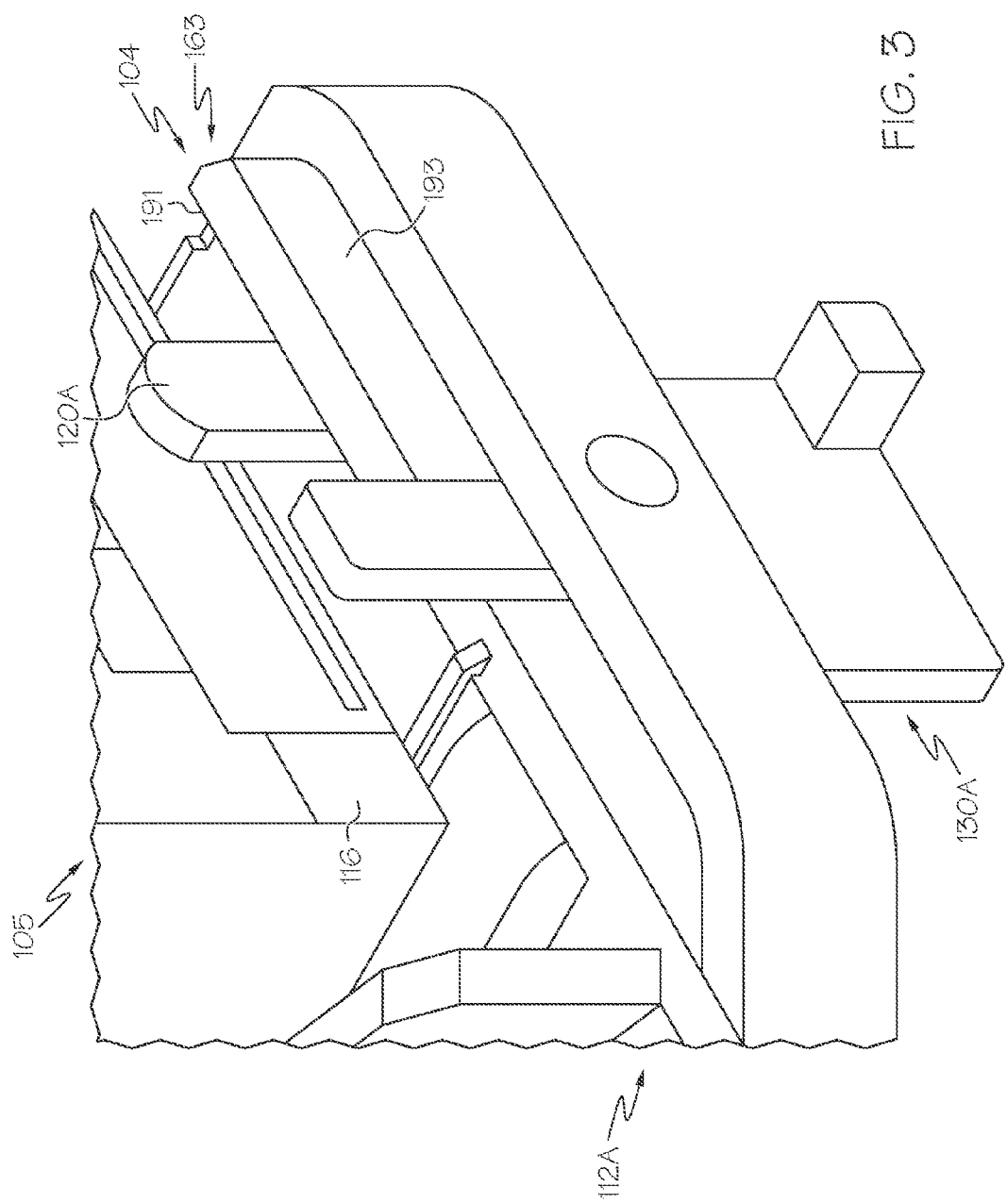
FIG. 3 depicts a gravity biased gate member and a manually actuated gate member coupled to a front portion of a first side of a vehicle according to one or more embodiments described herein.

Referring now to FIG. 3, the first side 104 of the front portion 105 of the vehicle 100 is depicted. The first manually actuated gate member 120A and the first gravity biased gate member 130A are coupled to the first side 104 of the front portion 105 of the vehicle 100 at the first load bearing deck 112A and are depicted in the extended configuration. In this embodiment, the first manually actuated gate member 120A is coupled to an inside face 191 of an inner support member 163 and the first gravity biased gate member 130A is coupled to an outside face 193 of the inner support member 163. In this embodiment, the load 116 is closer to the first manually actuated gate member 120A than the first gravity biased gate member 130A. In this embodiment, the load 116 can be laterally constrained by the first manually actuated gate member 120A without contacting the first gravity biased gate member 130A when the first manually actuated gate member 120A is in the extended configuration. The first gravity biased gate member 130A can provide lateral constraint to the load 116 when the first manually actuated gate member 120A is in the retracted configuration, for example, when the user forgets to move the first manually actuated gate member 120A into the extended configuration. That is, the first gravity biased gate member 130A and the first manually actuated gate member 120A can move independently of each other. It should be understood that the first manually actuated gate member 120A can be coupled to the inside face 191 or the outside face 193 of the inner support member 163 and the first gravity biased gate member 130A can be coupled to the inside face 191 or the outside face 193 of the inner support member 163.

Figure 4:
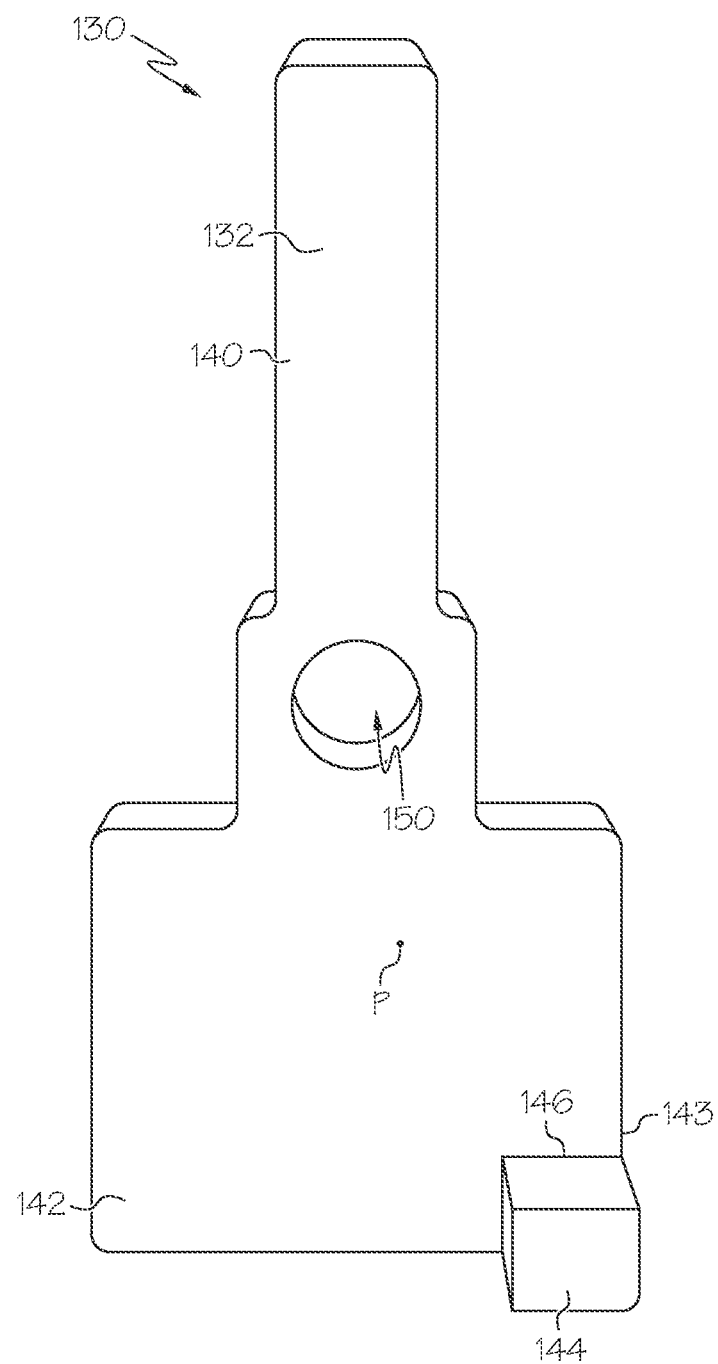
FIG. 4 depicts a front view of a gravity biased gate member according to one or more embodiments described herein.
Figure 5:
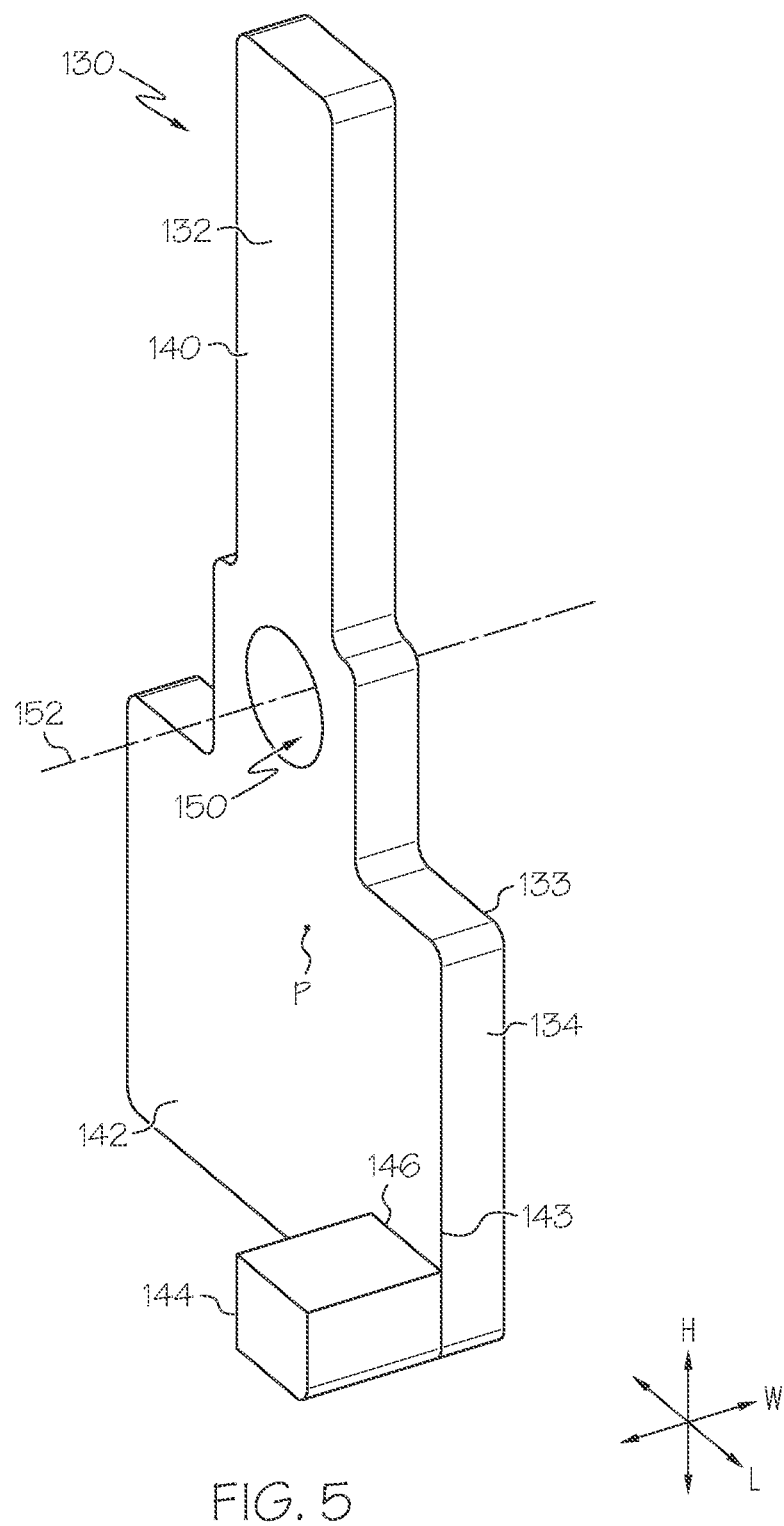
FIG. 5 depicts an isometric view of a gravity biased gate member according to one or more embodiments described herein.

Referring now to FIGS. 4 and 5, the one or more gravity biased gate members 130 will be described in detail with reference to a single gravity biased gate member 130 for ease of understanding. FIG. 4 depicts a front view of the gravity biased gate member 130 and FIG. 5 depicts an isometric view of the gravity biased gate member 130. The gravity biased gate member 130 may comprise steel, stainless steel, iron, fiberglass, plastic, or the like, and may comprise multiple materials coupled together or integral with one another. The gravity biased gate member 130 includes a top portion 140, a bottom portion 142, and a pivot hole 150. The center of the pivot hole 150 defines an axis of rotation 152 about which the gravity biased gate member 130 can rotate in both the forward and reverse directions. The axis of rotation 152 is disposed within the pivot hole 150 and can serve to divide the gravity biased gate member 130 into the top portion 140 and the bottom portion 142. The top portion 140 includes the portion of the gravity biased gate member 130 above the axis of rotation 152 and the bottom portion 142 includes the portion of the gravity biased gate member 130 below the axis of rotation 152.

The bottom portion 142 is heavier than the top portion 140 such that a center of mass (see point P for illustrative purposes) of the gravity biased gate member 130 is offset from the axis of rotation 152 in a generally vehicle heightwise direction H, below the axis of rotation 152. The bottom portion 142 may comprise a larger volume of material than the top portion 140 (e.g., a different shape), a denser material than the top portion 140, or a combination thereof, such that a weight differential is achieved between the top and bottom portions 140 and 142. The bottom portion 142 is at least heavy enough to retain the top portion 140, in an extended configuration, above the support surface 114 of the load bearing deck 112, during normal operation of the vehicle 100, for example, as depicted in FIG. 2. The weight differential can also be selected to provide the gravity biased gate member 130 with stability during acceleration and deceleration of the vehicle 100 and while the vehicle 100 is traversing a variety of terrain. In some embodiments, the bottom portion 142 weighs twice the top portion 140. In other embodiments, the weight ratio between the bottom portion 142 and the top portion 140 is three to one or greater, such as, for example, five to one. It should be understood that any weight ratio that biases the gravity biased gate member 130 into the extended configuration is contemplated.

The weight of the bottom portion 142 biases the gravity biased gate member 130 into the extended configuration when rotatably coupled to the vehicle 100 at the load bearing deck 112. In the extended configuration, the top portion 140 of the gravity biased gate member 130 extends above the support surface 114 of the load bearing deck 112, as depicted in FIG. 2. The gravity biased gate member 130 can be in the extended configuration in a variety of positions so long as the top portion 140 extends above the support surface 114. For example, the center of mass P of the gravity biased gate member 130 may be offset from the axis of rotation 152 in the generally vehicle heightwise direction H, below the axis of rotation 152, and in the generally vehicle widthwise direction W, causing the gravity biased gate member 130 to be biased in a variety of angular positions with respect to the vehicle 100. Further, when the gravity biased gate member 130 is moved into the retracted configuration, the top portion 140 of the gravity biased gate member 130 may be moved clockwise or counterclockwise into a horizontal orientation, or an angled orientation (e.g., about 90° from the extended configuration). As depicted in FIGS. 4 and 5, the length of the bottom portion 142 can be longer than the length of the top portion 140 in a vehicle lengthwise direction L, or vice versa. In this embodiment, the top portion 140 can be retracted below the support surface 114 of the load bearing deck 112 without the gravity biased gate member 130 reaching a completely horizontal orientation.

Figure 8:
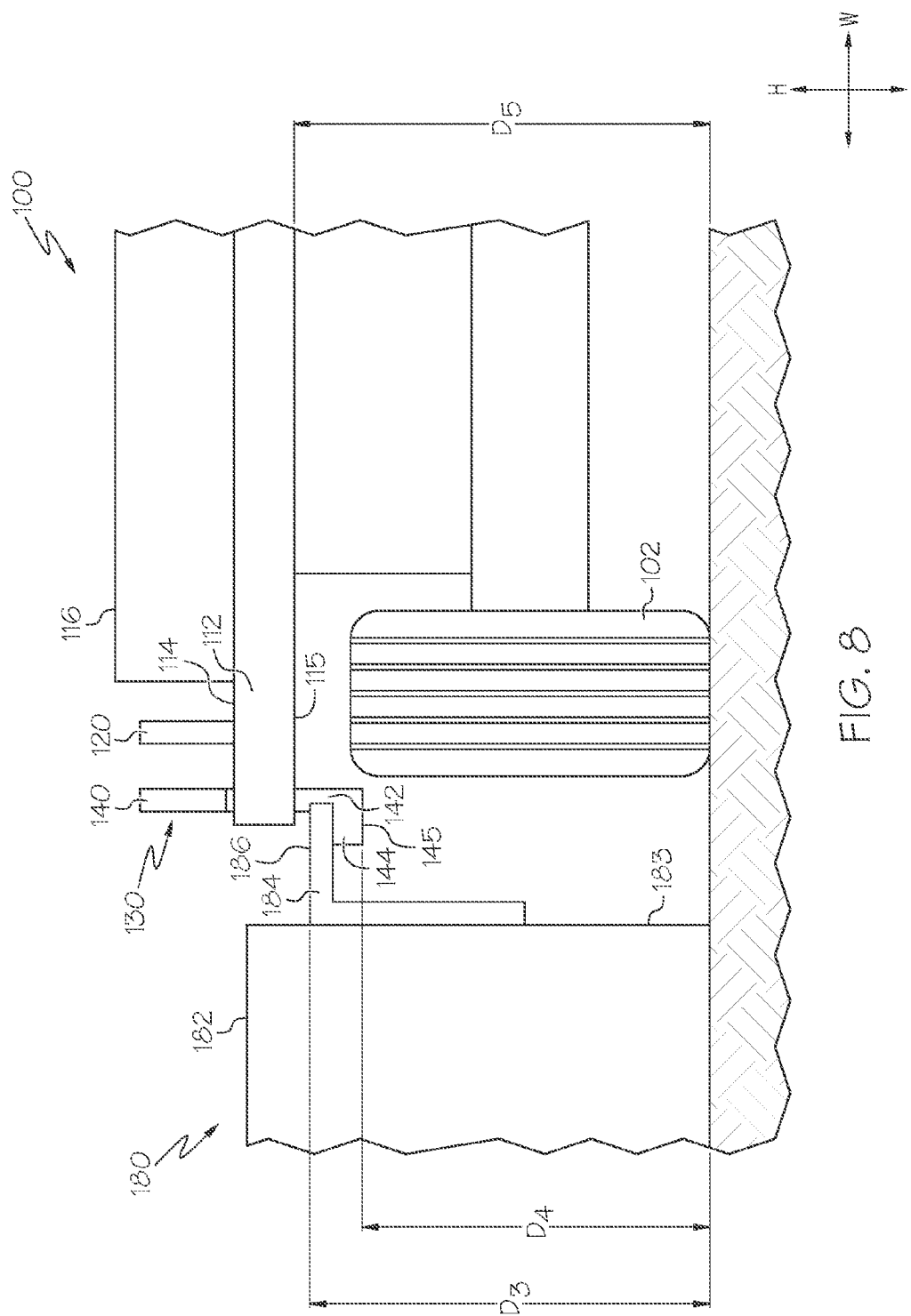
FIG. 8 depicts a side view of a vehicle and a pallet changing station according to one or more embodiments described herein.
Figure 9:
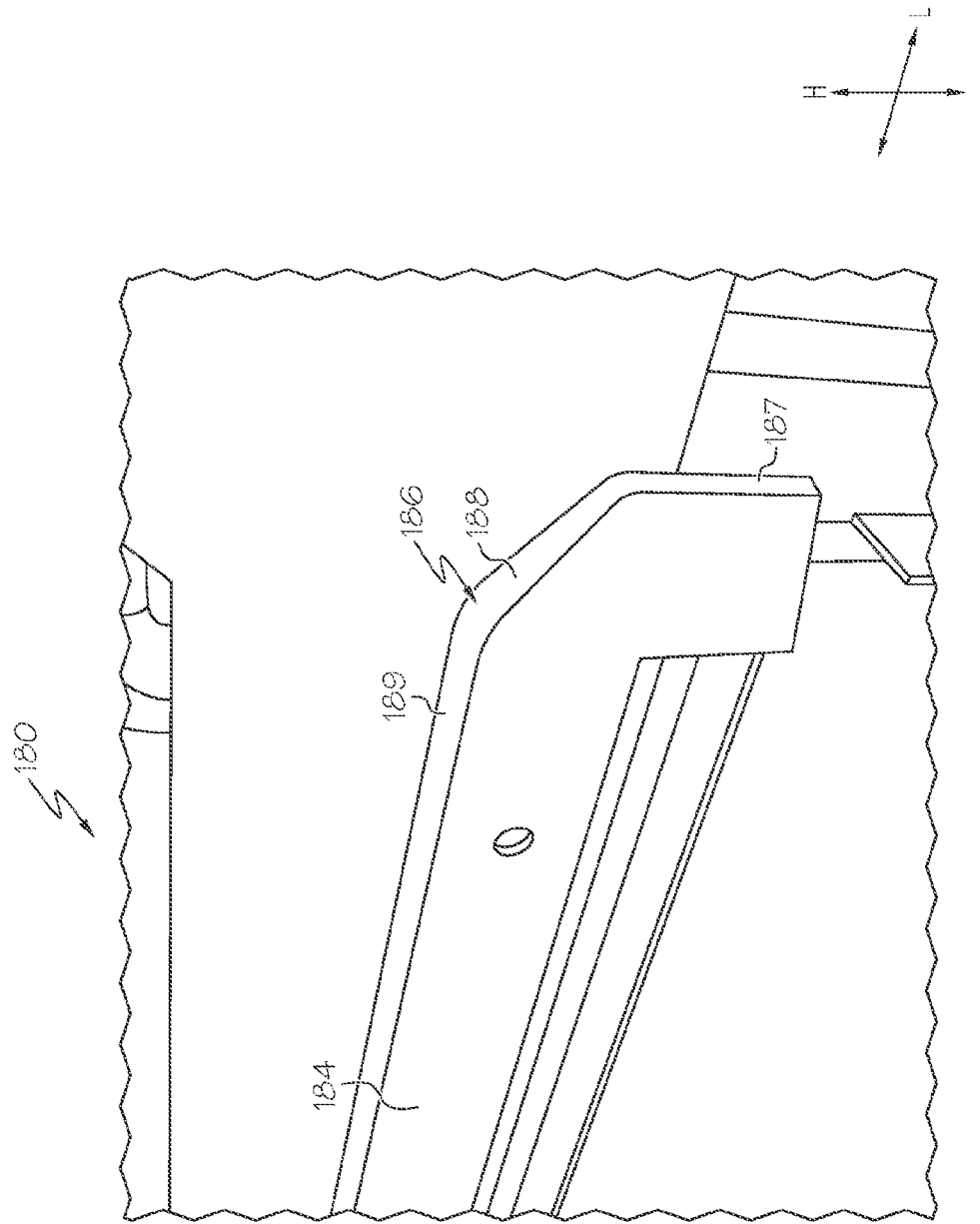
FIG. 9 depicts a partial, perspective view of a pallet changing station according to one or more embodiments described herein.
Figure 10:
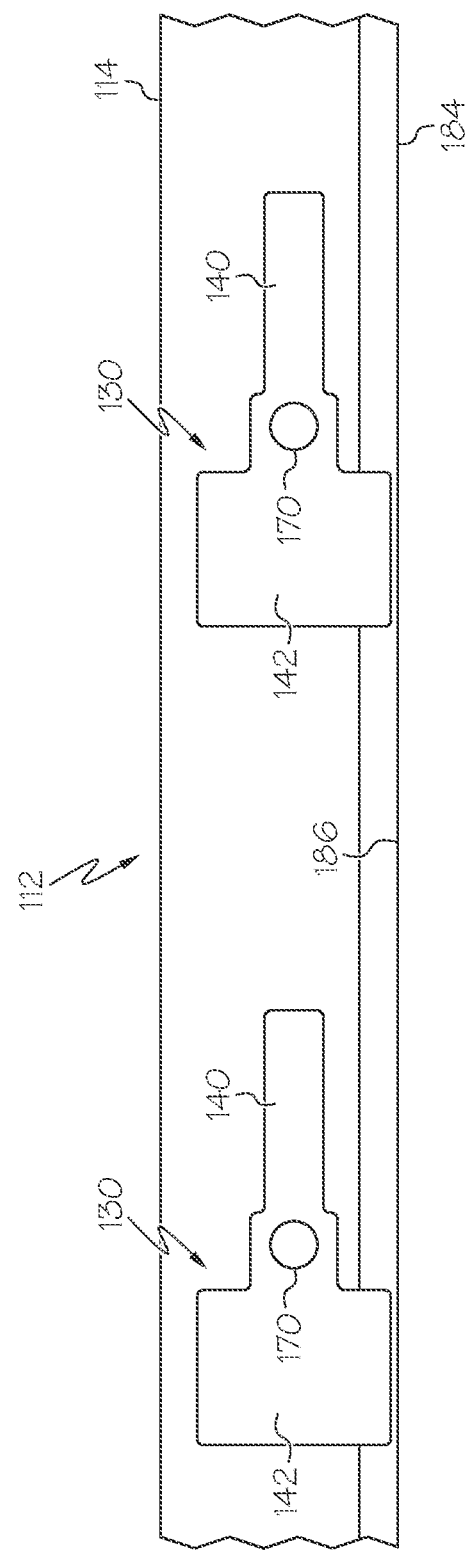
FIG. 10 depicts a side view of two gravity biased gate members in engagement with a gate member engagement member of a pallet changing station according to one or more embodiments described herein.

Referring still to FIGS. 4 and 5, the gravity biased gate member 130 includes a front face 132 facing outward, in the vehicle widthwise direction W, a rear face 133 facing inward, in the vehicle widthwise direction W, and a side face 134 extending around a periphery of the gravity biased gate member 130, defining the width of the gravity biased gate member 130 in the vehicle widthwise direction W. As described in detail below, the side face 134 of the gravity biased gate member 130 is engageable with a gate member engagement member 184 of a pallet changing station 180 (FIGS. 8-10). When the side face 134 of the gravity biased gate member 130 engages the gate member engagement member 184 at the bottom portion 142 of the gravity biased gate member 130, the gravity biased gate member 130 can be actuated into the retracted configuration. In the retracted configuration, the top portion 140 of the gravity biased gate member 130 is retracted below the support surface 114 of the load bearing deck 112 to facilitate removal of the load thereon.

In some embodiments, the bottom portion 142 includes an engagement protrusion 144 extending from the front face 132 of the gravity biased gate member 130. The engagement protrusion 144 can be positioned at an edge 143 of the bottom portion 142, extending outwardly from the side face 134 in the vehicle widthwise direction. This can create an extended engagement surface for engagement between the gravity biased gate member 130 and the gate member engagement member 184 (FIGS. 8-10). As depicted in FIGS. 4 and 5, the engagement protrusion 144 is positioned in a bottom corner 146 of the bottom portion 142. It should be understood that the engagement protrusion 144 could be positioned on any portion of the front face 132 of the bottom portion 142 that provides a location for engagement between the gravity biased gate member 130 and a gate member engagement member 184, as will be described in greater detail below.

Figure 6:
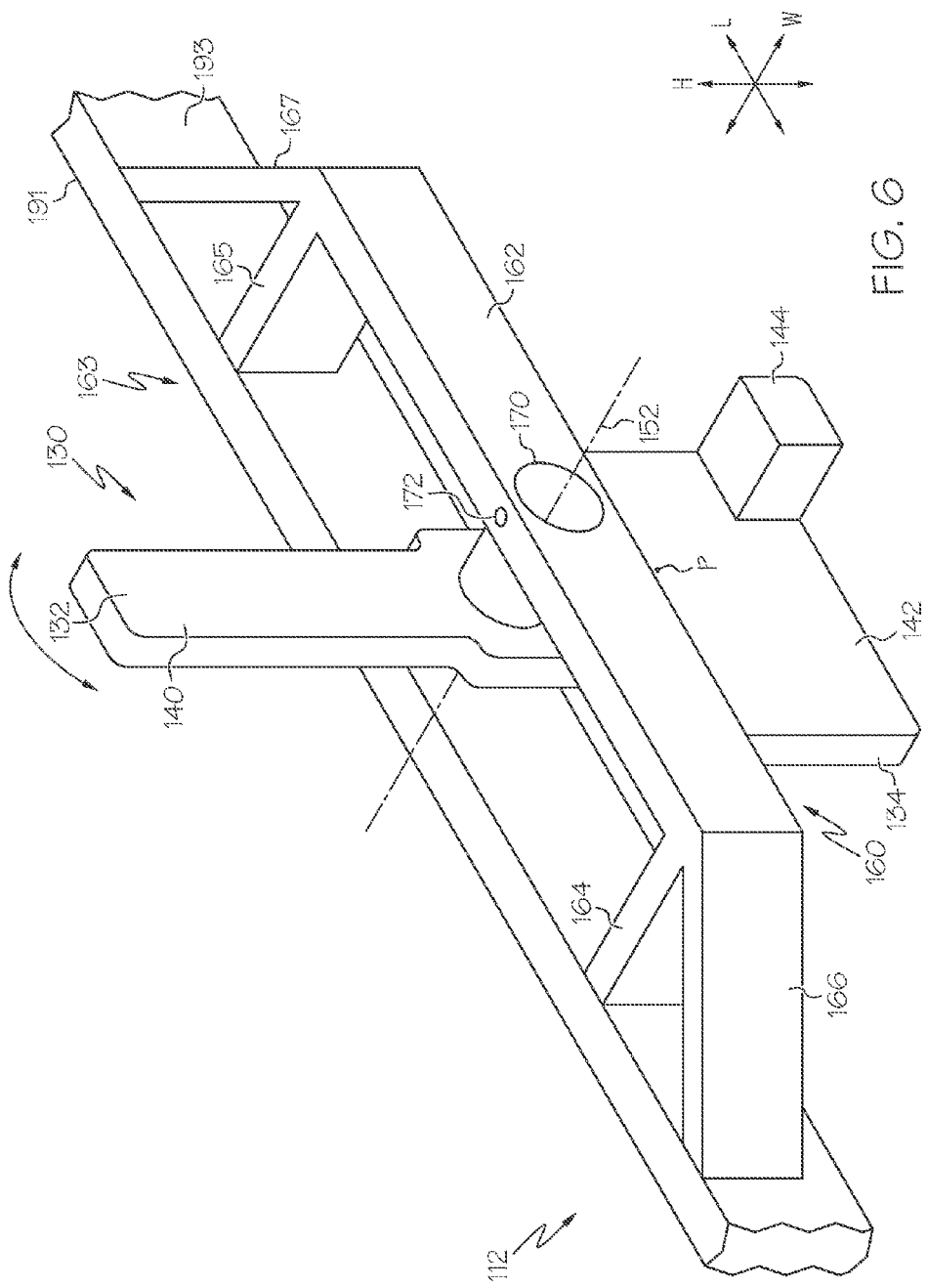
FIG. 6 depicts an isometric view of a gravity biased gate member in rotational engagement with an inner support member and a gate member support structure according to one or more embodiments described herein.

Referring now to FIG. 6, the gravity biased gate member 130 is depicted rotatably connected to the inner support member 163 and a gate member support structure 160, connected thereto. In some embodiments, the inner support member 163 may be part of the frame 110. In other embodiments, the inner support member 163 may be connected to the frame 110 to support the load bearing deck 112 thereon. The inner support member 163 comprises a metal such as steel or stainless steel, or any other suitable materials, for example, PVC or fiberglass. The gate member support structure 160 includes an outer beam 162 offset from the inner support member 163 in the vehicle widthwise direction by at least enough distance for the gravity biased gate member 130 to be positioned between and freely rotate between the inner support member 163 and the outer beam 162. The outer beam 162 extends substantially parallel with the inner support member 163 in the vehicle lengthwise direction L. The outer beam 162 comprises a metal such as steel or stainless steel, or any other suitable materials, for example, PVC or fiberglass.

The gate member support structure 160 may include one or more cross beams 164, 165 rigidly coupled to the outer beam 162 and extending between the inner support member 163 and the outer beam 162 in a generally vehicle widthwise direction W. The cross beams 164, 165 may comprise a metal such as steel or stainless steel, or any other suitable materials, for example, PVC or fiberglass. The cross beams 164, 165 extend between the outer beam 162 and the inner support member 163 in the vehicle widthwise direction W, rigidly coupling the outer beam 162 and the inner support member 163 using a fastener engagement, a welding engagement, or the like. Some embodiments of the gate member support structure 160 comprise two cross beams 164, 165 positioned apart in the vehicle lengthwise direction L by a distance greater than the height of the gravity biased gate member 130 such that the gravity biased gate member 130 is free to rotate about the axis of rotation 152 between the two cross beams 164, 165. In some embodiments, the gate member support structure 160 may not include the cross beams 164, 165.

The gate member support structure 160 may further include one or more diagonal beams 166, 167 rigidly coupled to and extending between the inner support member 163 and the outer beam 162 in a generally vehicle diagonalwise direction. The diagonal beams 166, 167 may comprise a metal such as steel or stainless steel, or any other suitable materials, for example, PVC or fiberglass. The diagonal beams 166, 167 can provide additional structural support to the gate member support structure 160. In some embodiments, the gate member support structure 160 does not include the one or more cross beams 164, or alternatively, does not include the diagonal beams 166. In embodiments that do not include one or more cross beams 164, 165, the diagonal beams 166, 167 do not impede the rotation of the gravity biased gate member 130. In some embodiments, the gate member support structure 160 may not include the diagonal beams 166, 167.

Still referring to FIG. 6, the gravity biased gate member 130 is positioned between the inner support member 163 and the outer beam 162 in a rotational engagement with each using a pivot pin 170. The pivot pin 170 is disposed through the pivot hole 150 of the gravity biased gate member 130 and into both the outer beam 162 and the inner support member 163. A roll pin 172 may be engageable with the pivot pin 170 to fasten the pivot pin 170 into engagement with the inner support member 163, the gravity biased gate member 130, and the outer beam 162. Further, the pivot pin 170 can define the axis of rotation 152 of the gravity biased gate member 130.

While embodiments of the gravity biased gate member 130 are described as being positioned between the inner support member 163 and the outer beam 162, it should be understood that the gravity biased gate member 130 could be rotationally coupled directly to the inner support member 163, the load bearing deck 112, or the frame 110 without including a gate member support structure 160. Further, it should be understood that the gravity biased gate member 130 could be rotatably coupled to the gate member support structure 160 without being coupled to the inner support member 163.

Figure 7:
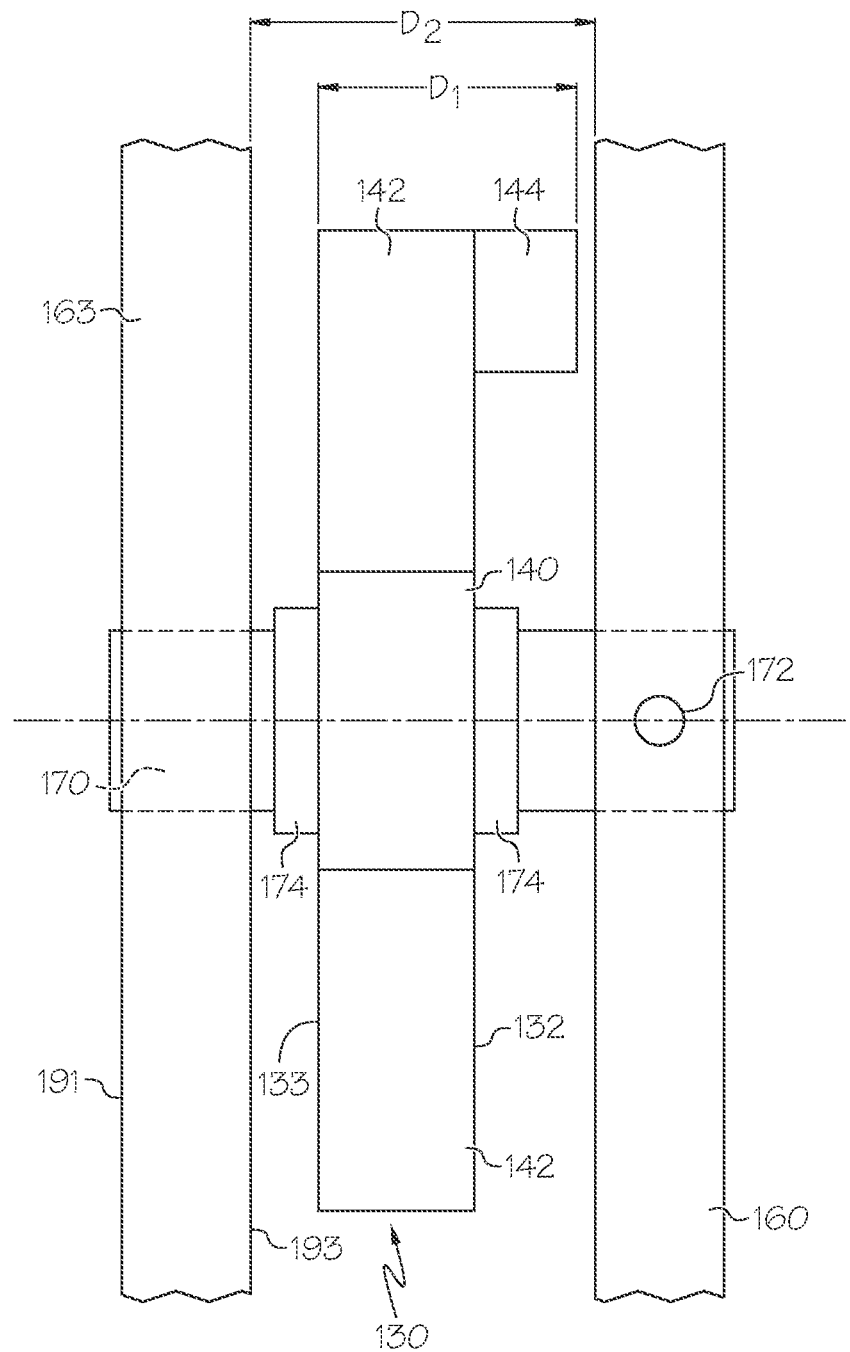
FIG. 7 depicts a top view of a gravity biased gate member in rotational engagement with a load bearing deck and a gate member support structure according to one or more embodiments described herein.

Referring now to FIG. 7, a top view of gravity biased gate member 130 in rotational engagement with the inner support member 163 and the outer beam 162 is depicted. FIG. 7 illustrates that the width $D_1$ of the gravity biased gate member 130 at the widest point of the gravity biased gate member 130 (for example, the engagement protrusion 144) in the vehicle widthwise direction W is less than the distance $D_2$ between the inner support member 163 and the outer beam 162, allowing free rotation of the gravity biased gate member 130. One or more washers 174 can be positioned between the front face 132 of the gravity biased gate member 130 and the inner support member 163 and between the rear face 133 of the gravity biased gate member 130 and the outer beam 162. The washers 174 can limit lateral motion of the gravity biased gate member 130 in the vehicle widthwise direction W, between the inner support member 163 and the outer beam 162, which can laterally stabilize the gravity biased gate member 130.

Referring now to FIG. 8, a pallet changing system including a pallet changing station 180 and a vehicle 100 is depicted. The pallet changing station 180 includes a pallet changing table 182 and the gate member engagement member 184 (e.g., a rail). The gate member engagement member 184 can be integral with or coupled to the pallet changing table 182. The gate member engagement member 184 extends outward from the pallet changing table 182 at a vehicle facing side 183 allowing the vehicle 100 to engage with the gate member engagement member 184. In particular, the gate member engagement member 184 is engageable with the bottom portion 142 of the gravity biased gate member 130 such that when the bottom portion 142 of the gravity biased gate member 130 engages the gate member engagement member 184, the gravity biased gate member 130 can be moved into the retracted configuration. In some embodiments, the gate member engagement member 184 comprises a rail, for example, an L-shaped rail (FIG. 8), a box-rail (FIG. 9), or the like.

In some embodiments, the length of the gate member engagement member 184 is greater than a length of the bottom portion 142 of the gravity biased gate member 130 in the vehicle lengthwise direction L. In embodiments of the vehicle 100 comprising more than one gravity biased gate member 130, the length of the gate member engagement member 184 can be at least as long as the distance between the axes of rotation 152 of the front most and the rear most gravity biased gate members 130, allowing gate member engagement member 184 to engage with and hold each gravity biased gate member 130 in the retracted configuration. In embodiments having two gravity biased gate members 130 on a side of the vehicle 100, such as the embodiments depicted in FIGS. 1 and 2, the length of the gate member engagement member 184 can be at least the distance between the axes of rotation 152 of each gravity biased gate member 130. In operation, a driver of the vehicle 100 can drive alongside gate member engagement member 184 and engage each gravity biased gate member 130 at their bottom portions 142 including their engagement protrusions 144 with gate member engagement member 184 such that each gravity biased gate member 130 is actuated into the retracted configuration. In some embodiments, the engagement protrusion 144 of the gravity biased gate members 130 can engage with the gate member engagement member 184 with or without the rest of the bottom portion 142 engaging with the gate member engagement member 184.

A height $D_3$ of the gate member engagement member 184 in the vehicle heightwise direction H, from a ground surface to an engagement surface 186 of the gate member engagement member 184, is such that when the bottom portion 142 including the engagement protrusion 144 of each gravity biased gate member 130 contacts the engagement surface 186, the gravity biased gate member 130 can be moved into the retracted configuration. To engage the bottom portion 142 of gravity biased gate member 130, the height $D_3$ of the gate member engagement member 184 should be between a height $D_4$, the distance from the ground surface to a bottom surface 145 of the gravity biased gate member 130 in the vehicle heightwise direction H, and a height $D_5$, the distance from the ground surface to a bottom surface 115 of the load bearing deck 112 in the vehicle heightwise direction H. It should be understood that the height $D_3$ can be configured to allow the gate member engagement member 184 to contact and actuate one or more gravity biased gate members 130 into the retracted configuration.

Referring now to FIG. 9, a partial view of the pallet changing station 180 is depicted. The gate member engagement member 184 depicted in this embodiment comprises a box rail. The gate member engagement member 184 includes an engagement surface 186 having a substantially vertical portion 187, extending in the vehicle heightwise direction H, for initial engagement with the bottom portion 142 of a gravity biased gate member 130, a substantially diagonal portion 188, extending partially in the vehicle heightwise direction H and partially in the vehicle lengthwise direction L, configured to partially rotate the gravity biased gate member 130, and a substantially horizontal portion 189, extending in the vehicle lengthwise direction L, configured to rotate the gravity biased gate member 130 into the retracted configuration. It should be understood that FIG. 9 depicts an exemplary embodiment and the gate member engagement member 184 may comprise any shape or size sufficient to move a gravity biased gate member 130 into retracted configuration.

Referring now to FIG. 10, two gravity biased gate members 130A, 130B engaged with the engagement surface 186 of the gate member engagement member 184 are depicted. The gravity biased gate members 130A and 130B depicted in FIG. 10 are each in the retracted configuration such that the top portions 140 of the gravity biased gate members 130A and 130B are retracted below the support surface 114 of the load bearing deck 112. Although depicted in a substantially horizontal orientation, it should be understood that the retracted configuration does not require the gravity biased gate members 130A, 130B to be in a horizontal orientation.

Another embodiment of the present disclosure includes a method of constraining the load 116 carried by the vehicle 100. The method includes placing the load 116 on the load bearing deck 112 of the vehicle 100 and constraining the load 116 using one or more gravity biased gate members 130 rotatably coupled to the vehicle 100 at the axis of rotation 152 and in the extended configuration, as described in detail above. The method further includes engaging the bottom portion 142 of the gravity biased gate members 130 with the gate member engagement member 184 of the pallet changing table 182, thereby moving the gravity biased gate members 130 into the retracted configuration. When the gravity biased gate members 130 are in the retracted configuration, the load 116 can be removed from the vehicle and a different load and can be placed onto the vehicle 100. When the vehicle 100 departs the pallet changing table 182 and the gate member engagement member 184 disengages the gravity biased gate members 130, the gravity biased gate members 130 return to the extended configuration. The vehicle 100 and the pallet changing station 180 can be used to move the load 116 between the load bearing deck 112 of the vehicle 100 and the pallet changing table 182, for example, in a factory or a warehouse.

Referring now to FIG. 11, an alternative embodiment of a gravity biased gate member 230 is depicted. The gravity biased gate member 230 includes a bottom portion 242 with a length in a vehicle lengthwise direction L that is substantially equivalent to the length of a top portion 240 in a vehicle lengthwise direction L. The gravity biased gate member 230 is rotatably coupled to an inner support member 263 and a gate member support structure 260, in substantially the same or a similar manner as the embodiment described above in reference to FIG. 6. The bottom portion 242 is heavier than the top portion 240 such that a center of mass (see point P for illustrative purposes) of the gravity biased gate member 230 is offset from an axis of rotation 252 in a generally vehicle heightwise direction H, below the axis of rotation 252. The bottom portion 242 may comprise a larger volume of material than the top portion 240 (for example, the bottom portion 242 may include an engagement protrusion 244), a denser material than the top portion 240, or a combination thereof such that a weight differential is achieved between the top and bottom portions 240 and 242. The weight differential between the top portion 240 and the bottom portion 242 biases the gravity biased gate member 230 into the extended configuration.

It should now be understood that vehicles and pallet changing systems incorporating gravity biased gate members can laterally constrain a load carried and transported by a vehicle. The gravity biased gate members are rotatably coupled to the vehicle at the load bearing deck of the vehicle. The gravity biased gate members include a top portion, a bottom portion, and a pivot hole defining an axis of rotation. The bottom portion is heavier than the top portion such that a center of mass of the gravity biased gate member is offset from the axis of rotation in the generally downward direction, biasing the gravity biased gate member into an extended configuration. In the extended configuration, the gravity biased gate member can provide lateral constraint to the load. Further, the gravity biased gate members can be engaged with a gate member engagement member of a pallet changing station, moving the gravity biased gate members into a retracted configuration, allowing a load to be moved between the vehicle and the pallet changing station.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   one or more wheels that allow movement of the vehicle from one location to another location;
   a frame mounted to the one or more wheels;
   a load bearing deck supported by the frame, the load bearing deck having a support surface for supporting a load thereon; and
   a gravity biased gate member rotatably coupled at the load bearing deck at an axis of rotation, the gravity biased gate member comprising a bottom portion below the axis of rotation that is heavier than a top portion above the axis of rotation such that a center of mass of the gravity biased gate member is offset from the axis of rotation, thereby biasing the gravity biased gate member into an extended configuration, wherein the axis of rotation extends transverse to a vehicle lengthwise direction and transverse to a travel direction of the vehicle.

2. The vehicle of claim 1, wherein when the gravity biased gate member is in the extended configuration, the top portion of the gravity biased gate member extends above the support surface of the load bearing deck.

3. The vehicle of claim 1, wherein the vehicle is a towed vehicle or a self-propelled vehicle.

4. The vehicle of claim 1 further comprising a manually actuated gate member rotatably coupled at the load bearing deck and actuatably coupled to a lever such that actuating the lever actuates the manually actuated gate member between an extended configuration and a retracted configuration, independent of movement of the gravity biased gate member.

5. The vehicle of claim 1 wherein the gravity biased gate member comprises a first gravity biased gate member rotatably coupled at the load bearing deck on a first side of the vehicle and a second gravity biased gate member rotatably coupled at the load bearing deck on a second side of the vehicle, opposite the first side of the vehicle.

6. The vehicle of claim 1, wherein a gate member support structure is rigidly coupled to a side of an inner support member, the gate member support structure comprising an outer beam offset from and rigidly coupled to the inner support member.

7. The vehicle of claim 6, wherein a first cross beam is positioned a distance from a second cross beam that is larger than a height of the gravity biased gate member such that the gravity biased gate member is free to rotate about the axis of rotation between the first cross beam and the second cross beam.

8. The vehicle of claim 1, wherein a weight of the bottom portion of the gravity biased gate member is more than double the weight of the top portion of the gravity biased gate member.

9. The vehicle of claim 1, wherein a length of the bottom portion of the gravity biased gate member in the vehicle lengthwise direction is larger than a length of the top portion of the gravity biased gate member in the vehicle lengthwise direction.

10. The vehicle of claim 1, wherein the gravity biased gate member is rotatably coupled to the frame at the load bearing deck at the axis of rotation.

11. A pallet changing system comprising:
    a vehicle comprising:
      one or more wheels that allow movement of the vehicle from one location to another location;
      a frame mounted to the one or more wheels;
      a load bearing deck supported by the frame, the load bearing deck having a support surface for supporting a load thereon; and
      a gravity biased gate member rotatably coupled at the load bearing deck at an axis of rotation, the gravity biased gate member comprising a bottom portion below the axis of rotation that is heavier than a top portion above the axis of rotation such that a center of mass of the gravity biased gate member is offset from the axis of rotation, thereby biasing the gravity biased gate member into an extended configuration; and
    a pallet changing table comprising a gate member engagement member, wherein the gate member engagement member is engageable with the bottom portion of the gravity biased gate member such that when the bottom portion of the gravity biased gate member engages with the gate member engagement member, the gravity biased gate member is moved into a retracted configuration.

12. The pallet changing system of claim 11, wherein when the gravity biased gate member is in the extended configuration, the top portion of the gravity biased gate member extends above the support surface of the load bearing deck.

13. The pallet changing system of claim 11, wherein when the gravity biased gate member is in the retracted configuration, the top portion of the gravity biased gate member is retracted below the support surface of the load bearing deck.

14. The pallet changing system of claim 11, wherein a length of the gate member engagement member is greater than a length of the bottom portion of the gravity biased gate member in a vehicle lengthwise direction.

15. The pallet changing system of claim 11 wherein the gravity biased gate member comprises a first gravity biased gate member rotatably coupled at the load bearing deck on a first side of the vehicle and a second gravity biased gate member rotatably coupled at the load bearing deck on a second side of the vehicle, opposite the first side of the vehicle.

16. The pallet changing system of claim 11, wherein a weight of the bottom portion of the gravity biased gate member is more than twice the weight of the top portion of the gravity biased gate member.

17. The vehicle of claim 2, wherein when the gravity biased gate member is in the extended configuration, the bottom portion of the gravity biased gate member extends below a bottom surface of the load bearing deck.

18. A vehicle comprising:
one or more wheels that allow movement of the vehicle from one location to another location;
a frame mounted to the one or more wheels;
a load bearing deck supported by the frame, the load bearing deck having a support surface for supporting a load thereon; and
a gravity biased gate member rotatably coupled at the load bearing deck at an axis of rotation, the gravity biased gate member comprising a bottom portion below the axis of rotation that is heavier than a top portion above the axis of rotation such that a center of mass of the gravity biased gate member is offset from the axis of rotation, thereby biasing the gravity biased gate member into an extended configuration;
a gate member support structure rigidly coupled to a side of an inner support member, the gate member support structure comprising an outer beam offset from and rigidly coupled to the inner support member; and
a first cross beam positioned a distance from a second cross beam that is larger than a height of the gravity biased gate member such that the gravity biased gate member is free to rotate about the axis of rotation between the first cross beam and the second cross beam.

19. The vehicle of claim 18, wherein when the gravity biased gate member is in the extended configuration, the top portion of the gravity biased gate member extends above the support surface of the load bearing deck.

20. The vehicle of claim 18, wherein a length of the bottom portion of the gravity biased gate member in a vehicle lengthwise direction is larger than a length of the top portion of the gravity biased gate member in the vehicle lengthwise direction.

* * * * *